(12) United States Patent
Karasev

(10) Patent No.: US 6,740,472 B2
(45) Date of Patent: May 25, 2004

(54) POLYMER MATERIALS WITH INDEPENDENT LATENT IMAGES VISIBLE IN POLARIZED LIGHT AND METHODS FOR THEIR PRODUCTION

(75) Inventor: Andrey Karasev, Moscow (RU)

(73) Assignee: Latent Image Technologies Ltd., Jerusalem (IL)

( * ) Notice: Subject to any disclaimer, the term of this patent is extended or adjusted under 35 U.S.C. 154(b) by 3 days.

(21) Appl. No.: 10/159,043

(22) Filed: Jun. 3, 2002

(65) Prior Publication Data

US 2003/0224257 A1 Dec. 4, 2003

(51) Int. Cl.⁷ ................................................. G03C 5/00
(52) U.S. Cl. ........................ 430/312; 430/320; 359/485
(58) Field of Search ................................ 430/312, 320; 359/485

(56) References Cited

U.S. PATENT DOCUMENTS 6,100,967 A    8/2000  Farrer et al.
6,124,970 A    9/2000  Karassev et al.

FOREIGN PATENT DOCUMENTS

EP    0689065 A1    6/1995
EP    0689084 A1    6/1995

*Primary Examiner*—Rosemary Ashton
(74) *Attorney, Agent, or Firm*—Mark M Friedman

(57) ABSTRACT

An authenticatable product comprising a non-opaque latent image layer of anisotropic polymer material having background optical properties with a given preferred direction of anisotropy and a given proportion of crystallinity, the latent image layer being treated so as to include: a first localized modification in the latent image layer being associated with a first latent image; and a second localized modification in the latent image layer being associated with a second latent image such that, when viewed directly, the first latent image and the second latent image are indistinguishable from the remainder of the latent image layer and, under polarized visualization, a maximum contrast between the first latent image and the remainder of the latent image layer is actualized at a different orientation of polarized visualization than a maximum contrast between the second latent image and the remainder of the latent image layer.

13 Claims, 2 Drawing Sheets

POLYMER MATERIALS WITH INDEPENDENT LATENT IMAGES VISIBLE IN POLARIZED LIGHT AND METHODS FOR THEIR PRODUCTION

FIELD AND BACKGROUND OF THE INVENTION

The present invention relates to security and authentication and, in particular, it concerns polymer layers having independent latent images visible in polarized light and methods for generating such layers. It is known to produce various copy-resistant features in manufactured products to guard against forgery. Typical examples of such features are water-marks, holograms, micro-printing and embedded metallic strips. An alternative type of protection could be provided by features which, although not immediately visible, may readily be checked to confirm the authenticity of a product. One attempt at such a feature employs implanted liquid crystal optical elements, which are configured to affect the polarization of transmitted light such that, when viewed through a polarizer, an identifiable pattern is seen. Examples of such a structure are described in European Patent Publications EP 689 065 A1 and EP 689 084 A1. The structures disclosed are multi-layer structures forming optical components based on a photo-crosslinked liquid crystal "monomer". Formation of the optical components in the liquid crystal polymers requires multiple coating of the substrate material with subsequent photochemical, electrical, magnetic and mechanical processing. The structures described in the aforementioned documents suffer from considerable practical limitations. Firstly, formation of multi-layer liquid crystal components with separate processing of each layer requires complex and expensive manufacturing equipment and materials. Secondly, the various layers making up the liquid crystal components differ in their optical, chemical and mechanical properties. These differences may lead to de-lamination and/or image quality deterioration when the structure is exposed to thermal, chemical or mechanical stresses. Furthermore, the complexity of the multi-layer structure rules out its use in certain applications such as, for example, flexible film. It is also important to note that liquid crystal images are normally visible when viewed directly by the human eye. The formation of a single latent image within a polymer material is described in U.S. Pat. No. 6,124,970 to Karassev, et al., which teaches producing independent latent images by superimposing two independent polymer layers to form a multi-layer structure. A shortcoming of the aforementioned method is that the complexity of the multi-layer structure rules out its use in certain applications, as mentioned above.

There is therefore a need for latent image products in which independent latent images, visible in polarized light, are provided within a single polymer layer, which are convenient and economical to produce, and which are structurally simple and mechanically stable such that they can be used in a wide range of practical applications. It would also be advantageous to provide straightforward and economical methods for producing such products.

SUMMARY OF THE INVENTION

The present invention is an authenticatable product including a layer of polymer material which has independent latent images invisible when viewed in unpolarized light which become separately visible with the aid of polarizers. The invention also relates to methods for producing such polymer layers.

According to the teachings of the present invention there is provided, an authenticatable product comprising a non-opaque latent image layer of anisotropic polymer material having background optical properties with a given preferred direction of anisotropy and a given proportion of crystallinity, the latent image layer being treated so as to include: (a) a first localized modification in the latent image layer, the first localized modification being associated with a first latent image and modified in at least one of the given preferred direction of anisotropy and the given proportion of crystallinity; and (b) a second localized modification in the latent image layer, the second localized modification being associated with a second latent image and modified in at least one of the given preferred direction of anisotropy and the given proportion of crystallinity such that, when viewed directly, the first latent image and the second latent image are indistinguishable from the remainder of the latent image layer and, under polarized visualization, a maximum contrast between the first latent image and the remainder of the latent image layer is actualized at a different orientation of polarized visualization than a maximum contrast between the second latent image and the remainder of the latent image layer.

According to the teachings of the present invention at least part of the first latent image and at least part of the second latent image coexist within the same area of the latent image layer.

According to a further feature of the present invention the first localized modification and the second localized modification have mechanical properties substantially identical to mechanical properties of the remainder of the latent image layer.

According to a further feature of the present invention the latent image layer is designed such that optical properties of the latent image layer are substantially unchanged by exposure to temperatures of up to 150 degrees Centigrade.

According to a further feature of the present invention the latent image layer is substantially transparent.

According to a further feature of the present invention the latent image layer is highly transparent.

According to a further feature of the present invention the latent image layer is implemented as part of a laser die cut label.

According to a further feature of the present invention, there is also provided, an authenticatable product comprising a non-opaque latent image layer of polymer material treated so as to include a first latent image and a second latent image such that, when viewed directly, the first latent image and the second latent image are indistinguishable from the remainder of the latent image layer and, under polarized visualization, a maximum contrast between the first latent image and the remainder of the latent image layer is actualized at a different orientation of polarized visualization than a maximum contrast between the second latent image and the remainder of the latent image layer.

According to a further feature of the present invention, there is also provided, a method for producing two latent images comprising the steps of: (a) treating an initially photostable anisotropic polymer having a stretch direction, with a solution containing a photoactivator agent so as to render at least part of the polymer sensitive to radiation; (b) selectively exposing the polymer to a first type of radiation so as to form the first latent image therein; (c) developing the first latent image; (d) selectively exposing the polymer to a second type of radiation so as to form the second latent image therein, wherein the second type of radiation is polarized and the polarization vector of the second type of radiation is oriented at a first angle to the stretch direction; (e) developing the second latent image; and (f) fixing the first latent image and the second latent image, wherein all the above steps are performed such that, when viewed directly, the first latent image and the second latent image are indistinguishable from the remainder of the polymer and, under polarized visualization, a maximum contrast between the first latent image and the remainder of the polymer is actualized at a different orientation of polarized visualization than a maximum contrast between the second latent image and the remainder of the polymer.

According to a further feature of the present invention the step of developing the second latent image and the step of fixing are performed simultaneously.

According to a further feature of the present invention the first type of radiation is ultraviolet radiation and the second type of radiation is infrared radiation.

According to a further feature of the present invention the first type of radiation is infrared radiation and the second type of radiation is ultraviolet radiation.

According to a further feature of the present invention the first type of radiation is polarized and the polarization vector of the first type of radiation is oriented at a second angle to the stretch direction during the step of selectively exposing the polymer to a first type of radiation wherein the first angle differs from the second angle.

According to a further feature of the present invention the first angle is between 30 degrees and 60 degrees.

According to the teachings of the present invention there is also provided the step of laser die cutting the polymer to form a label.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an authenticatable product including a layer of polymer material which has independent latent images invisible when viewed in unpolarized light which become separately visible with the aid of polarizers. The invention also relates to methods for producing such polymer layers.

The latent image polymer layers of the present invention are of great importance for verifying genuineness of articles of various types and for authenticating documents, financial securities, consumer goods, etc. to prevent forgery, mimicking and unauthorized alteration.

Locally modified structures in polymer films form Stable Latent Images (SLI) invisible in natural light and visible in polarized light. SLI cannot be copied by standard copying equipment.

The principles and operation of the authenticatable product according to the present invention may be better understood with reference to the drawings and the accompanying description.

Figure 1:
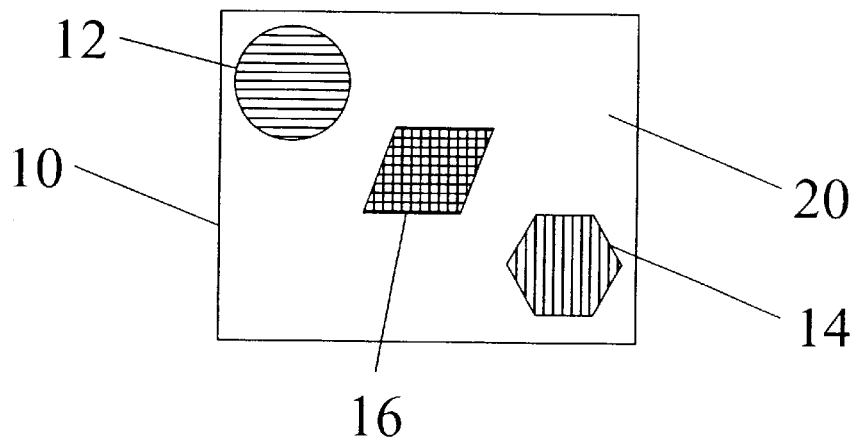
FIG. 1 is a schematic plan view of a polymer layer treated so as to contain two latent images which are visible in polarized light that is constructed and operable in accordance with a preferred embodiment of the invention.

Reference is now made to FIG. 1, which is a schematic plan view of a polymer layer 10 treated so as to contain two latent images which are visible in polarized light that is constructed and operable in accordance with a preferred embodiment of the invention. Polymer layer 10 may be used alone, thereby corresponding to the most basic example of an authenticatable product according to the present invention, or can be used in a wide range of different applications including, but not limited to, those described in U.S. Pat. No. 6,124,970 to Karassev, et al.

Generally speaking, polymer layer 10 is treated so as to contain a first localized modification and a second localized modification in polymer layer 10. The first localized modification is associated with a first latent image. For illustrative purposes, the first localized modification is manifest within two areas of polymer layer 10, namely, an area 12 and an area 16. The modification of polymer layer 10 within area 12 and area 16 may be throughout the thickness of polymer layer 10 or just a fraction of the thickness of polymer layer 10. The second localized modification is associated with a second latent image. For illustrative purposes, the second localized modification is manifest within two areas of the polymer, namely, an area 14 and area 16. Therefore, the first localized modification and the second localized modification coexist within area 16, meaning that the first localized modification and the second localized modification coexist within the thickness of polymer layer 10 within area 16. It should be noted however, that the first localized modification and the second localized modification may or may not share the same volume within the thickness of polymer layer 10 within area 16. It should be noted that polymer layer 10 is treated so as to contain a number of areas 12, 14, 16 having optical properties differing from those of other areas 20, such that, when viewed directly, area 12 and area 16 of the first latent image and area 14 and area 16 of the second latent image are indistinguishable from other areas 20 and, under polarized visualization, a maximum contrast between area 12 and area 16 of the first latent image and other areas 20 is actualized at a different orientation of polarized visualization than a maximum contrast between area 14 and area 16 of the second latent image and other areas 20.

Figure 2:
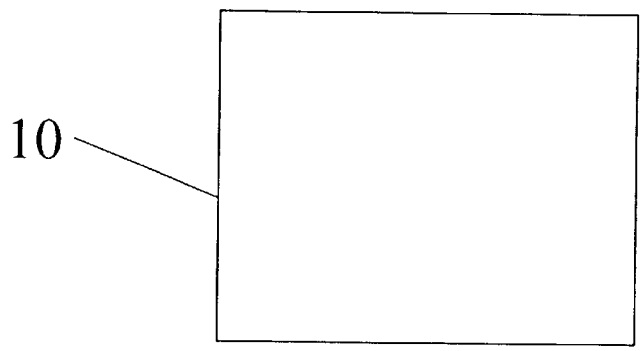
FIG. 2 is a plan view of the polymer layer of FIG. 1 when viewed without polarized visualization.

Reference is now made to FIG. 2, which is a plan view of polymer layer 10 when viewed without polarized visualization. As stated above, when viewed directly without polarized visualization, area 12 and area 16 of the first latent image and area 14 and area 16 of the second latent image are indistinguishable from other areas 20.

Unlike the liquid-crystal-based technology of the aforementioned prior art, it is a particular feature of the present invention that the latent images are formed within a single, otherwise substantially uniform, layer of polymer material. Although the layer may be used together with additional layers to provide desired structural properties or functionality, the latent image layer itself can be produced and used to provide its light modulating effect without any additional layers.

Figure 3:
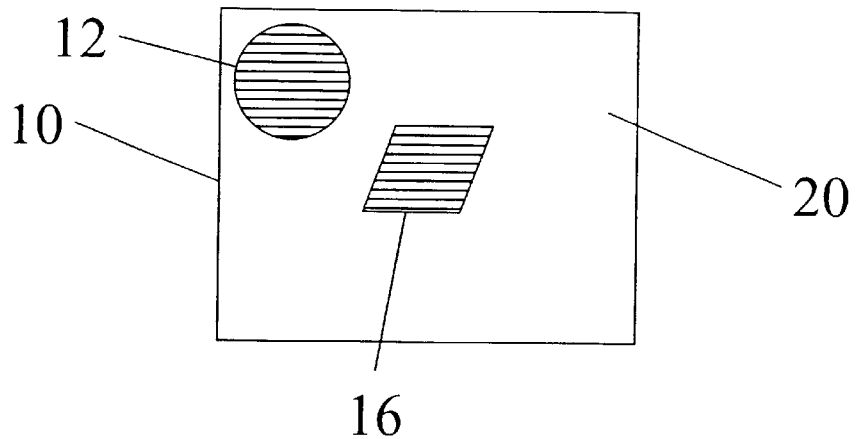
FIG. 3 is a plan view of the polymer layer of FIG. 1 when viewed by polarized visualization in order to see the first latent image.
Figure 4:
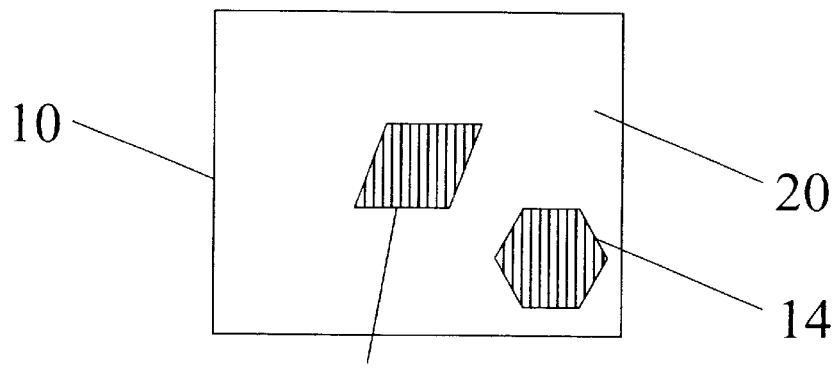
FIG. 4 is a plan view of the polymer layer of FIG. 1 when viewed by polarized visualization in order to see the second latent image.
Figure 5:
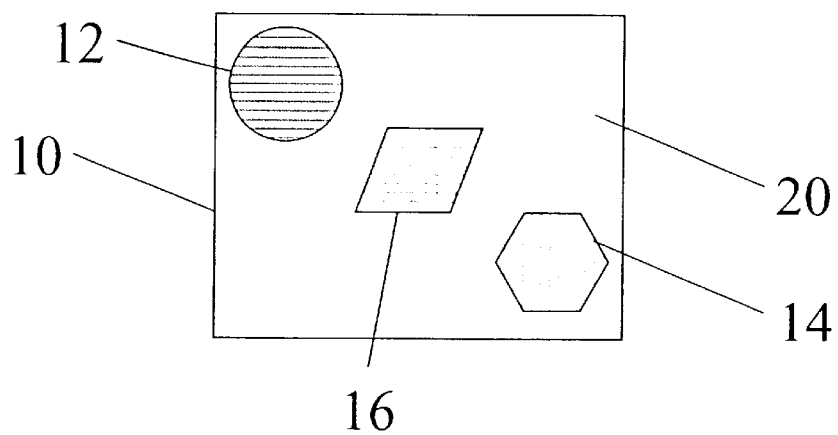
FIG. 5 is a plan view of the polymer layer of FIG. 1 when viewed by polarized visualization in order to partially see the first and second latent images.

Reference is now made to FIGS. 3, 4 and 5. FIG. 3 is a plan view of polymer layer 10 when viewed by polarized visualization in order to see the first latent image. FIG. 4 is a plan view of polymer layer 10 when viewed by polarized visualization in order to see the second latent image. FIG. 5 is a plan view of polymer layer 10 when viewed by polarized visualization in order to partially see the first and second latent images. The optical effect of polymer layer 10 is typically one of selective rotation of the polarization of transmitted light within at least one of area 12, area 14, area 16 and other areas 20. The extent of the rotation is dependent upon the structure of the polymer matrix and the depth to which areas 12, 14, 16 are produced. Structurally, areas 12, 14, 16 differ from background areas 20 in the preferred direction of anisotropy and/or in the proportions of amorphousness and crystallinity of the polymer. Thus, the areas 12, 14, 16 may be relatively either more or less oriented than the background areas 20, and the preferred directions of anisotropy may differ.

The various techniques which may be employed to view the latent images of the present invention are referred to collectively herein in the description and claims as "polarized visualization". Polarized visualization generally requires viewing polymer layer 10 as an intermediate optical element between two polarizing elements. In the simplest implementation of polymer layer 10 as a transparent film, polarized visualization is most effectively achieved by viewing the film between crossed polarizers. As the film is rotated, representing a change in the orientation of polarized visualization, differing levels of contrast between the first latent image and the remainder of polymer layer 10 are exhibited. Likewise, as the film is rotated, differing levels of contrast between the second latent image and the remainder of polymer layer 10 are exhibited. As stated above, a maximum contrast between area 12 and area 16 of the first latent image and other areas 20 (FIG. 3) is actualized at a different orientation of polarized visualization than a maximum contrast between area 14 and area 16 of the second latent image and other areas 20 (FIG. 4). Typically the first latent image and the second latent image are visible together at various levels of optical density at certain orientations of polarized visualization (FIG. 5). Visualization may also be possible between parallel or otherwise oriented polarizers, but the contrast obtained is typically lower than that achieved between crossed polarizers. Other forms of polarized visualization in which one polarizer is attached to polymer layer 10, or in which light passes twice through the same polarizer by reflection are described in U.S. Pat. No. 6,124,970 to Karassev, et al.

Figure 6:
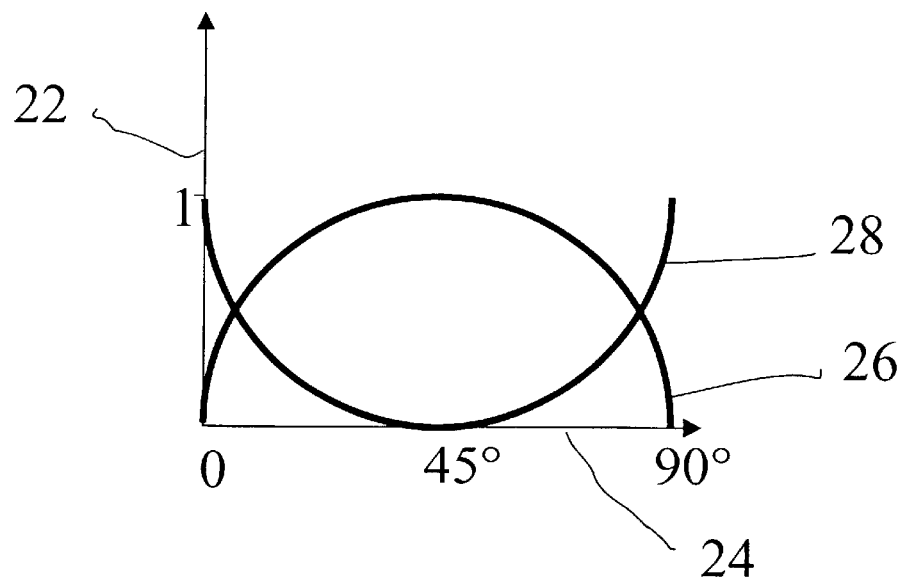
FIG. 6 is a graph illustrating the relative optical intensity of the two latent images when viewed at differing rotation angles under polarized visualization.

Reference is now made to FIG. 6, which is a graph illustrating the relative optical intensity of the two latent images when viewed at differing rotation angles under polarized visualization. An axis 22 represents the optical visibility of an image under polarized visualization. An axis 24 represents the rotation angle of the film relative to a linear polarizer. A line 26 represents the optical characteristics of the second latent image and a line 28 represents the optical characteristics of the first latent X image. The first latent image, represented by line 28, has a maximum visibility at zero degrees and 90 degrees. The second latent image, represented by line 26, has a maximum visibility at 45 degrees. The above illustration assumes that the maximum intensities of the latent images are separated by 45 degrees. However, it should be noted that polymer layer 10 can be treated, see the method below, whereby the maximum intensities of the latent images are separated by varying angles under polarized visualization.

It will be noted that the latent images of the present invention correspond to variations in crystallinity and/or directions of anisotropy in a layer which is otherwise highly uniform. As a result, and in contrast to liquid crystal based structures, areas 12, 14, 16, 20 are typically indistinguishable when viewed under unpolarized or polarized illumination, and even when viewed obliquely.

The single layer structure of the latent image layers of the present invention provide profound advantages for practical implementations. Firstly, the mechanical properties of areas 12, 14, 16 are identical, or very similar, to those of other areas 20 of polymer layer 10. As a result, problems of de-lamination or image quality deterioration under mechanical stress are effectively eliminated. In addition, the materials used are preferably chosen such that the optical properties of polymer layer 10 are substantially unchanged by exposure to elevated temperatures, typically in a range of up to about 150 degrees Centigrade.

Turning now to the production of polymer layer 10 according to the present invention, this can typically be subdivided into six stages: firstly, treating an initially photostable anisotropic polymer having a stretch direction, with a solution containing a photoactivator agent so as to render at least part of the polymer sensitive to radiation; secondly, selectively exposing the polymer to a first type of radiation so as to form a first latent image therein; thirdly, developing the first latent image; fourthly, selectively exposing the polymer to a second type of radiation so as to form a second latent image therein, wherein the second type of radiation is polarized and the polarization vector of the second type of radiation is oriented at a first angle to the stretch direction of the polymer; fifthly, developing the second latent image; and finally, fixing the first latent image and the second latent image.

Typically, the fifth step and the final step are performed simultaneously. It is also possible, when using some polymers, for example cellophane, to perform the second step fourth and to perform the fourth step second. The first angle is typically between the range of 30 degrees and 60 degrees. In the most preferred embodiment of the present invention the first angle is substantially 45 degrees. In the most preferred embodiment of the present invention, the first type of radiation is ultraviolet (UV) radiation and the second type of radiation is infrared (IR) radiation. It is also possible, when using some polymers, for example cellophane, for the first type of radiation to be infrared radiation and the second type of radiation to be ultraviolet radiation. It should be noted that ultraviolet radiation is typically produced using a UV lamp and polarized ultraviolet radiation is produced using a low power eximer laser. In an alternate embodiment of the present invention the first type of radiation is also polarized and the polarization vector of the first type of radiation is oriented at a second angle to the stretch direction during the second step, the first angle being different from the second angle. Various techniques may be employed to develop and fix the latent images after exposing with the radiation, one being a chemical wet processing and another being a dry process under the action of infrared light. It should also be noted that in an alternate embodiment of the present invention, the first radiation is applied to one side of the polymer layer and the second radiation is applied to the other side of the polymer layer. The result of the above process is a locally modified structure of the polymer matrix.

The present invention can be implemented in a number of different types of polymer film including, but not limited to, polyethylene, polypropylene, copolymers with E.V.A. and fluoropolymers such as "Teflon". Clearly, in order to produce a viewable image, the polymer films used must be "non-opaque", defined herein to imply a transparency of at least about 20%. In order to obtain a high quality image, the layer must be "substantially transparent", defined herein to imply at least about 50% transmission. In the case of optically dense materials such as Teflon, acceptable levels of transparency may be achieved by forming a micro-layer on the surface of a transparent substrate. In certain preferred implementations of the present invention, high transparencies of polymer layer 10 in excess of about 90% are obtained.

A first preferred example to be described here in detail relates to the use of Hydrate Cellulose film or "Cellophane". Photosensitivity in Hydrate Cellulose film is created by impregnating it in 2% solution of Copper (II) Chloride ($CuCl_2$) in 1% Hydrochloric Acid (HCl) for 12 hours. After drying of the film at room temperature, until the surface of the film is dry, it is ready for irradiation. The photosensitive film is exposed to UV light, using a low pressure mercury lamp, through a mask for about 10 to 30 minutes depending on intensity of the lamp and the distance of the film from the light source. The UV light used need not be polarized. This exposure causes local modification of the polymer structure of the film with a change in the degree of crystallization and a different preferred direction of anisotropy from the unexposed background areas. These changes are developed by soaking the polymer film in water for about 10 seconds. After drying the film at room temperature, until the surface is dry, it is ready for a second irradiation. The film is exposed to polarized IR light. The angle between stretch direction of the film and the polarization vector of the light is about 45 degrees. The IR exposure causes another local modification of the polymer structure with a preferred direction of anisotropy different from unexposed background areas and the already locally modified polymer structure after the UV exposure. The exposed film is developed and fixed in 1% water solution of Potassium Thiocyanate (KCNS) for 10 minutes to remove copper compounds from volume of the film. The developed film is rinsed in water and dried preferably at room temperature until its surface is dry.

A second preferred example to be described here in detail also relates to the use of Hydrate Cellulose film or "Cellophane". Photosensitivity in Hydrate Cellulose film is created by impregnating it in aqueous 2% solution of Iron (III) Chloride ($FeCl_3$) for 12 hours. After drying of the film at room temperature, until its surface is dry, it is ready for irradiation. The photosensitive film is exposed to UV light, using a low pressure mercury lamp, through a mask for about 10 to 30 minutes depending on intensity of the lamp and the distance of the film from the light source. The UV light used need not be polarized. This exposure causes a local modification of the polymer structure of the film with a change in the degree of crystallization and a different preferred direction of anisotropy from the unexposed background areas. These changes are developed by soaking the polymer film in water for about 10 seconds. After drying of the film at room temperature, until the surface is dry, it is ready for a second irradiation. The film is exposed to polarized IR light. The angle between stretch direction of the film and the polarization vector of the light is 45 degrees. The IR exposure causes another local modification of the polymer structure with a preferred direction of anisotropy different from unexposed background areas and the already locally modified polymer structure after the UV exposure.

The exposed film is developed and fixed in water for 10 minutes to remove iron compounds from volume of the film. The developed film is rinsed in water and dried preferably at room temperature until its surface is dry.

In an optional additional production step, the exposed film may be die cut using a laser to produce labels or other desired shapes. Die cutting is typically performed after the latent images are produced, as laser die cutting typically requires positioning marks which can be formed during the process of creating the latent images.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

What is claimed is:

1. An authenticatable product comprising a non-opaque latent image layer of anisotropic polymer material having background optical properties with a given preferred direction of anisotropy and a given proportion of crystallinity, said latent image layer being treated so as to include:
   (a) a first localized modification in said latent image layer, said first localized modification being associated with a first latent image and modified in at least one of said given preferred direction of anisotropy and said given proportion of crystallinity; and
   (b) a second localized modification in said latent image layer, said second localized modification being associated with a second latent image and modified in at least one of said given preferred direction of anisotropy and said given proportion of crystallinity such that, when viewed directly, said first latent image and said second latent image are indistinguishable from the remainder of said latent image layer and, under polarized visualization, a maximum contrast between said first latent image and the remainder of said latent image layer is actualized at a different orientation of polarized visualization than a maximum contrast between said second latent image and the remainder of said latent image layer and wherein at least part of said first latent image and at least part of said second latent image coexist within the same area of said latent image layer.

2. The product of claim 1, wherein said first localized modification and said second localized modification have mechanical properties substantially identical to mechanical properties of the remainder of said latent image layer.

3. The product of claim 1, wherein said latent image layer is designed such that optical properties of said latent image layer are substantially unchanged by exposure to temperatures of up to 150 degrees Centigrade.

4. The product of claim 1, wherein said latent image layer is substantially transparent.

5. The product of claim 1, wherein said latent image layer is highly transparent.

6. The product of claim 1, wherein said latent image layer is implemented as part of a laser die cut label.

7. A method for producing two latent images comprising the steps of:
   (a) treating an initially photostable anisotropic polymer having a stretch direction, with a solution containing a photoactivator agent so as to render at least part of said polymer sensitive to radiation;
   (b) selectively exposing said polymer to a first type of radiation so as to form said first latent image therein;

(c) developing said first latent image;

(d) selectively exposing said polymer to a second type of radiation so as to form said second latent image therein, wherein the second type of radiation is polarized and the polarization vector of the second type of radiation is oriented at a first angle to said stretch direction;

(e) developing said second latent image; and (f) fixing said first latent image and said second latent image, wherein all the above steps are performed such that, when viewed directly, said first latent image and said second latent image are indistinguishable from the remainder of said polymer and, under polarized visualization, a maximum contrast between said first latent image and the remainder of said polymer is actualized at a different orientation of polarized visualization than a maximum contrast between said second latent image and the remainder of said polymer.

8. The method of claim 7 wherein said step of developing said second latent image and said step of fixing are performed simultaneously.

9. The method of claim 7 wherein the first type of radiation is ultraviolet radiation and the second type of radiation is infrared radiation.

10. The method of claim 7 wherein the first type of radiation is infrared radiation and the second type of radiation is ultraviolet radiation.

11. The method of claim 7 wherein the first type of radiation is polarized and the polarization vector of the first type of radiation is oriented at a second angle to said stretch direction during said step of selectively exposing said polymer to a first type of radiation wherein said first angle differs from said second angle.

12. The method of claim 7 wherein said first angle is between 30 degrees and 60 degrees.

13. The method of claim 7 further comprising the step of laser die cutting said polymer to form a label.

* * * * *